US012560210B2

(12) United States Patent
Church

(10) Patent No.: US 12,560,210 B2
(45) Date of Patent: Feb. 24, 2026

(54) AIR DISC BRAKE SYSTEM WITH CALIPER RETRACTION AND METHODS FOR THE USE AND ASSEMBLY THEREOF

(71) Applicant: Bendix Commercial Vehicle Systems LLC, Avon, OH (US)

(72) Inventor: David R. Church, Richland, MI (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 371 days.

(21) Appl. No.: 18/223,192

(22) Filed: Jul. 18, 2023

(65) Prior Publication Data

US 2025/0027548 A1     Jan. 23, 2025

(51) Int. Cl.
*F16D 65/00* (2006.01)
*F16D 65/18* (2006.01)
*B60T 13/58* (2006.01)
*F16D 55/00* (2006.01)
*F16D 121/08* (2012.01)
*F16D 125/64* (2012.01)
*F16D 127/02* (2012.01)

(52) U.S. Cl.
CPC ..... *F16D 65/0087* (2013.01); *F16D 65/0068* (2013.01); *F16D 65/18* (2013.01); *B60T 13/588* (2013.01); *F16D 2055/0029* (2013.01); *F16D 2055/007* (2013.01); *F16D 2121/08* (2013.01); *F16D 2125/64* (2013.01); *F16D 2127/02* (2013.01)

(58) Field of Classification Search
CPC .. F16D 65/0087; F16D 65/0068; F16D 65/18; F16D 2055/0029; F16D 2055/007; F16D 2121/08; F16D 2125/64; F16D 2127/02; B60T 13/588
See application file for complete search history.

(56) References Cited

U.S. PATENT DOCUMENTS

| | | | |
|---|---|---|---|
| 4,058,084 A | 11/1977 | Kawaguchi et al. | |
| 4,193,481 A * | 3/1980 | Wunderlich | F16D 65/54 188/73.31 |
| 4,229,013 A * | 10/1980 | Burke | F16D 65/18 277/560 |
| 4,488,622 A * | 12/1984 | Stoka | F16D 55/227 188/72.3 |
| 4,729,569 A * | 3/1988 | Muller | F16J 15/324 277/584 |
| 4,887,696 A * | 12/1989 | Redenbarger | F16D 65/54 188/73.34 |
| 6,397,983 B1 * | 6/2002 | Roszman | F16D 55/227 188/73.44 |

(Continued)

*Primary Examiner* — Thomas W Irvin

(74) *Attorney, Agent, or Firm* — Crowell & Moring LLP

(57) ABSTRACT

An air disc brake system includes a carrier and a guide pin mounted to the carrier. A caliper is slidably mounted on the guide pin. The caliper has an annular groove extending radially outwardly from an inner circumferential surface. The caliper is moveable relative to the guide pin from a non-braking position to a braking position. A friction ring is disposed in the annular groove and is deformable from a first configuration when the caliper is in the non-braking position to a second configuration when the caliper is in the braking position. The friction ring biases the caliper from the braking position to the non-braking position. Methods of using and assembling the air disc brake system are also provided.

17 Claims, 6 Drawing Sheets

(56) References Cited

U.S. PATENT DOCUMENTS

| | | | |
|---|---|---|---|
| 7,055,829 B2 * | 6/2006 | Russell | F16J 15/3268 |
| | | | 277/611 |
| 7,721,854 B1 * | 5/2010 | Mackiewicz | F16D 65/54 |
| | | | 188/73.44 |
| 9,388,870 B2 * | 7/2016 | Cesani | F16D 65/18 |
| 9,512,892 B2 * | 12/2016 | Burgoon | F16D 65/54 |
| 9,919,686 B2 | 3/2018 | Stahl et al. | |
| 10,253,835 B2 * | 4/2019 | Wagner | F16D 65/095 |
| 11,773,928 B2 * | 10/2023 | Philpott | F16D 55/227 |
| | | | 188/73.44 |
| 12,038,054 B2 * | 7/2024 | Kang | F16D 65/183 |
| 2012/0234635 A1 * | 9/2012 | Wake | F16D 55/2265 |
| | | | 188/73.45 |
| 2017/0350460 A1 * | 12/2017 | Meise | F16D 55/22655 |
| 2022/0186797 A1 * | 6/2022 | Philpott | F16D 65/0087 |
| 2023/0022467 A1 * | 1/2023 | Kang | F16D 65/183 |

* cited by examiner

AIR DISC BRAKE SYSTEM WITH CALIPER RETRACTION AND METHODS FOR THE USE AND ASSEMBLY THEREOF

FIELD OF THE INVENTION

The present application relates generally to an air disc brake system, and in particular to an air disc brake system configured to automatically retract the caliper and brake pad after braking, together with methods for the use and assembly thereof.

BACKGROUND

Air disc brake systems may be configured with opposing pairs of brake pads, with an inner brake pad actuated to engage one side of a brake rotor and an outer brake pad carried by a caliper engaging the other side of the rotor. Brake drag may occur if the caliper fails to completely release the brake pad after an operator releases the brakes. Brake drag may lead to premature wear of the brake pads and/or rotor, and may contribute to overheating and excess wear of various brake components and the resultant damage associated therewith.

SUMMARY

The present invention is defined by the following claims, and nothing in this section should be considered to be a limitation on those claims.

In one aspect, one embodiment of an air disc brake system includes a carrier and a guide pin mounted to the carrier. The guide pin has an outer circumferential surface. A caliper is slidably mounted on the guide pin. The caliper has an inner circumferential surface surrounding the outer circumferential surface and an annular groove extending radially outwardly from the inner circumferential surface. The caliper is moveable relative to the guide pin from a non-braking position to a braking position. A friction ring is disposed in the annular groove. The friction ring has an inner circumferential surface engaging the outer circumferential surface of the guide pin. The friction ring is deformable from a first configuration when the caliper is in the non-braking position to a second configuration when the caliper is in the braking position. The friction ring biases the caliper from the braking position to the non-braking position.

In another aspect, one embodiment of an air disc brake system includes a carrier and a guide pin mounted to the carrier, wherein the guide pin has an outer circumferential surface. The caliper includes a housing slidably mounted on the guide pin. The housing has a bore with an inner circumferential surface surrounding the outer circumferential surface and an annular groove extending radially outwardly from the inner circumferential surface. The housing is moveable relative to the guide pin from a non-braking position to a braking position. A friction ring is disposed in the annular groove. The friction ring has an inner circumferential surface engaging the outer circumferential surface of the guide pin. The friction ring is deformable from a first configuration when the housing is in the non-braking position to a second configuration when the housing is in the braking position. The friction ring biases the housing from the braking position to the non-braking position. The caliper includes a lever supported by an eccentric bearing disposed in the housing. The lever has a first portion engageable by an actuator, and a second portion extending from the first portion. The lever is pivotable relative to the caliper housing on the eccentric bearing from an unactuated position to an actuated position. The caliper also includes a bridge engaged by the second portion of the lever. The bridge is moveable from a first position to a second position as the lever is pivoted from the unactuated position to the actuated position. In one embodiment, the housing is moved to the braking position as the bridge is moved to the second position.

In another embodiment, an air disc brake system includes a carrier and a guide pin mounted to the carrier, wherein the guide pin has an outer circumferential surface and an annular groove extending radially inwardly from the outer circumferential surface. A caliper is slidably mounted on the guide pin, wherein the caliper includes an inner circumferential surface surrounding the outer circumferential surface, and wherein the caliper is moveable relative to the guide pin from a non-braking position to a braking position. A friction ring is disposed in the annular groove, wherein the friction ring includes an outer circumferential surface engaging the inner circumferential surface of the caliper, and wherein the friction ring is deformable from a first configuration when the caliper is in the non-braking position to a second configuration when the caliper is in the braking position, and wherein the friction ring biases the caliper from the braking position to the non-braking position.

In another aspect, one embodiment of a method of actuating an air disc brake system includes applying a force to a lever, moving a bridge in a first axial direction with the lever in response to the force being applied to the lever, moving an inner brake pad operably coupled to the bridge in the first axial direction, sliding a caliper in a second axial direction opposite the first axial direction on a guide pin, deforming a friction ring disposed between the caliper and the guide pin, moving an outer brake pad in the second axial direction with the caliper, releasing the force from the lever, biasing the bridge in the second axial direction with a spring, and biasing the caliper in the first axial direction with the friction ring.

Various other methods of using and assembling the air disc brake system are also provided.

The various embodiments of the air disc brake system and components, and methods for the use and assembly thereof, provide significant advantages over other air disc brake systems and methods. For example, and without limitation, the friction ring provides an automatic retractive force to the caliper and brake pads, pulling the brake pads away from the brake rotor and thereby helping to reduce the possibility of brake drag. Moreover, the system allows for maintaining the retractive force overtime, even as the brake pads wear, for example and without limitation by way of a sliding interface between the friction ring and the guide pin. The size and shape of the friction ring, together with the size and shape of the groove, may be varied to accommodate differently sized air disc brakes. The friction ring, if positioned adjacent a boot mounted on the guide pin, may also advantageously provide a second seal between the brake pads and the interface between the caliper and guide pin, thereby further reducing the possibility of contamination from dust or dirt between the caliper and guide pin. In addition, return springs may be eliminated, and/or may be reduced in size.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

Figure 1:
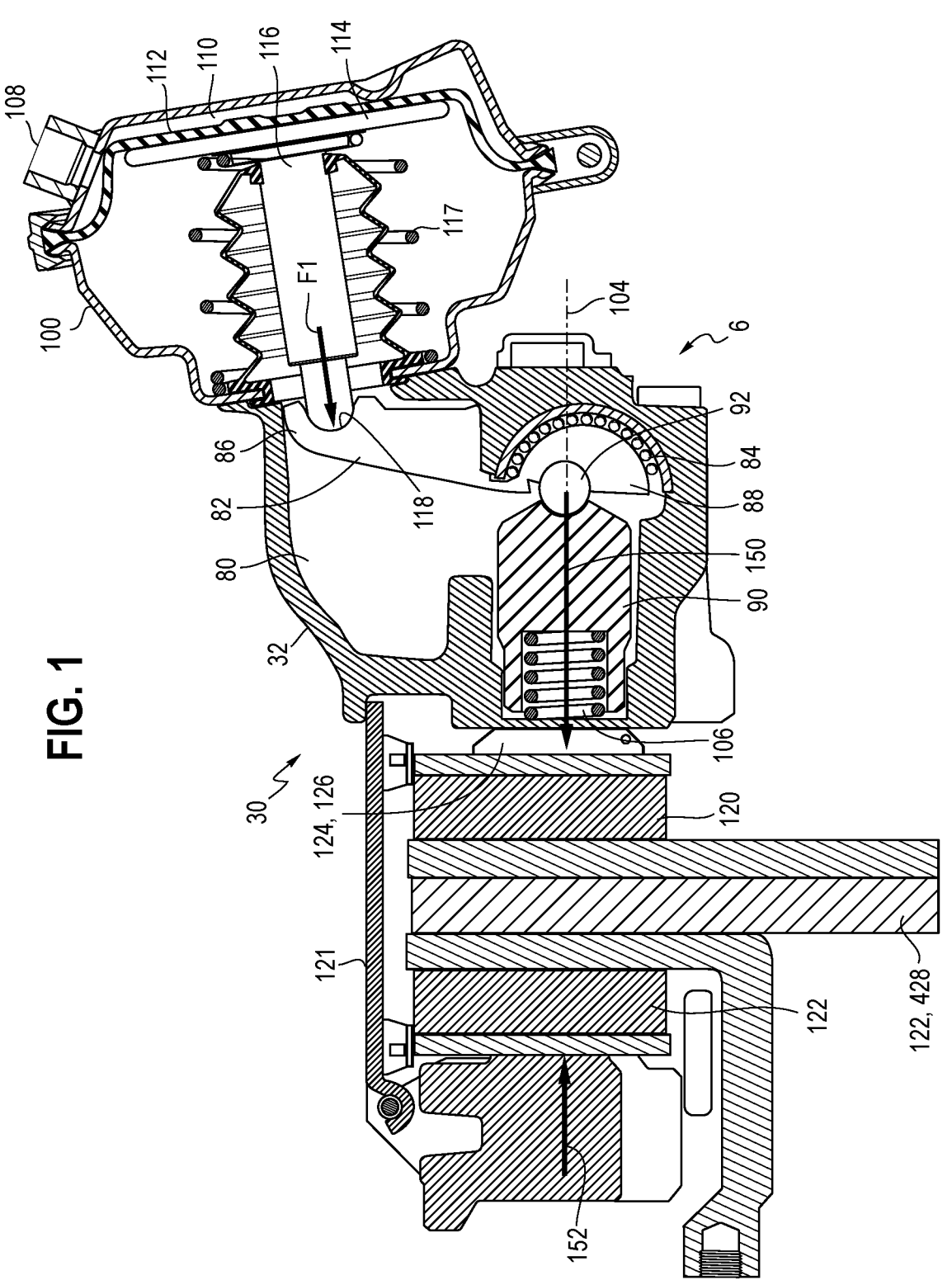
FIG. 1 is a first cross-sectional schematic view of one embodiment of an air disc brake system including an actuator.

It should be understood that the term "plurality," as used herein, means two or more. The term "longitudinal," as used herein means of or relating to a length or lengthwise direction 2, for example a direction running parallel to the axis of a guide pin 16, as shown for example in FIGS. 2 and 3. The term "lateral," as used herein, means situated on, directed toward or running in a side-to-side direction 4 transverse to the longitudinal direction 2. The term "transverse" means non-parallel. The term "outwardly" refers to a direction facing away from a centralized location, for example the phrase "radially outwardly" refers to a feature diverging away from a centralized location, for example axis 12 of the guide pin 16. It should be understood that features or components facing or extending "outwardly" do not necessarily originate from the same centralized point, but rather generally emanate outwardly and exteriorly along a non-tangential vector. Conversely, the term "inwardly" refers to a direction facing toward the centralized or interior location.

The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components.

Referring to FIGS. 1, 2, 4, 5 and 6, an air disc brake system 6 includes an anchor plate 8, 308 and a carrier 10, 310 connected to the anchor plate, for example with a plurality of fasteners 14, 314, which may include a combination of bolts and washers. The fasteners 14, 314 may be oriented parallel to the axis 12, or perpendicular to the axis 12. A pair of guide pins 16, 18 are mounted to the carrier 10, 310 with fasteners 20, 22, shown as bolts, and extend in the longitudinal direction 2. In one embodiment, a first guide pin 16 has a first length and a second guide pin 18 has a second length, with the first length being greater than the second length. It should be understood that more than two guide pins may be coupled to the carrier. In one embodiment, the guide pins 16, 18 are coupled to the carrier by way of the fasteners 20, 22 through a threadable engagement with the housing or with nuts positioned on an opposite side of the housing, although the guide pins may be coupled by press fit, welding or other known fastening techniques. Each guide pin 16, 18 has an outer circumferential surface 24, 26. The guide pins may be cylindrical, or may have other shapes, including non-circular cross-sections.

A caliper 30 includes a housing 32 having a pair of bores 34, 36 positioned to receive the guide pins 16, 18 respectively. A cap 19 is coupled to close off the bore 34, 36. Each bore 34, 36, which are preferably cylindrical but may have other shapes, for example matching the shape of the guide pins, has an inner circumferential surface 38, 40 defining a cross sectional area shaped to receive the guide pin 16, 18 and surrounding the outer circumferential surface 24, 26 of the guide pin 16, 18. A bushing 42, 44 is mounted in each bore 34, 36, for example by press fit, with the bushing engaging the inner circumferential surface 38, 40. The bushing 42, 44 defines an inner circumferential surface 46, 48, with the outer circumferential surface 24, 26 of the guide pin 16, 18 slidably engaging the inner circumferential surface 46, 48 of the bushing 42, 44. The bushing 42, 44 may be single bushing, or may be configured as a pair of spaced apart bushings separated by a gap (G) and spaced on opposite sides of the groove 50.

The caliper housing 32 is configured with an annular groove 50 extending radially outwardly from the inner circumferential surface 38 of the bore. An annular friction ring 52 is disposed in the annular groove 50. In one embodiment, the groove 50 may be positioned between a pair of longitudinally spaced first and second bushings 42, 54, while in other embodiments, the groove may be positioned at a location spaced apart from either end of a single bushing 42. The spacing between the bushings, or between the groove and any bushing, is determined such that the groove 50 and friction ring 52 do not overlap with the bushing 42, 54 during the operation of the air disc brake system, including during the flexing and or sliding of the friction ring 52 relative to the guide pin 16. The annular groove 50 may include a shoulder 56, 58. In various embodiments, the shoulder 56 is shaped as a convex rounded corner, or the shoulder 58 may be tapered or angled between a side wall 60 of the annular groove and the inner circumferential surface 38 of the bore.

The friction ring 52 has an inner circumferential surface 62 engaging the outer circumferential surface 24 of the guide pin 16. In one embodiment, the friction ring 52 has a rectangular cross-section, which may be configured as a square cross section, with the inner circumferential surface having a flat or linear inner circumferential surface 62 defining a contact area which may create a friction force with and grip the outer circumferential surface 24 of the guide pin 16. The friction ring 52 may have other suitable cross sections. The friction ring 52 may be made of any deformable material, including without limitation urethane or rubber. Preferably, the material of the friction ring 52 has a relatively high melting point, such that the friction ring may maintain its static shape when exposed to elevated temperatures.

Figure 4:
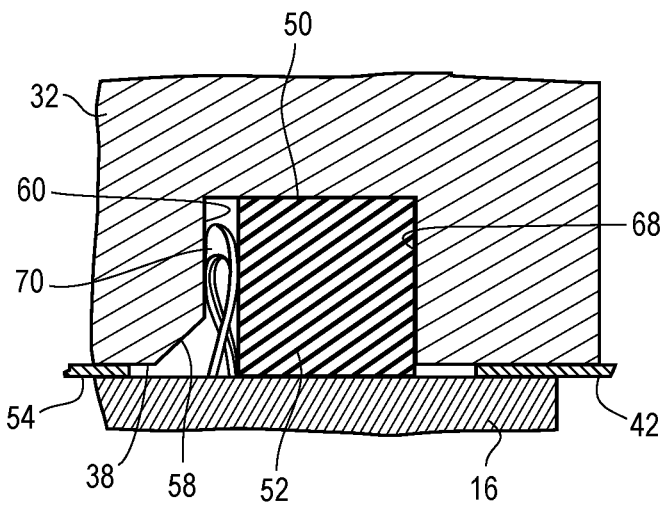
FIG. 4 is a partial, enlarged view of an alternative embodiment of a friction ring.
Figure 5:
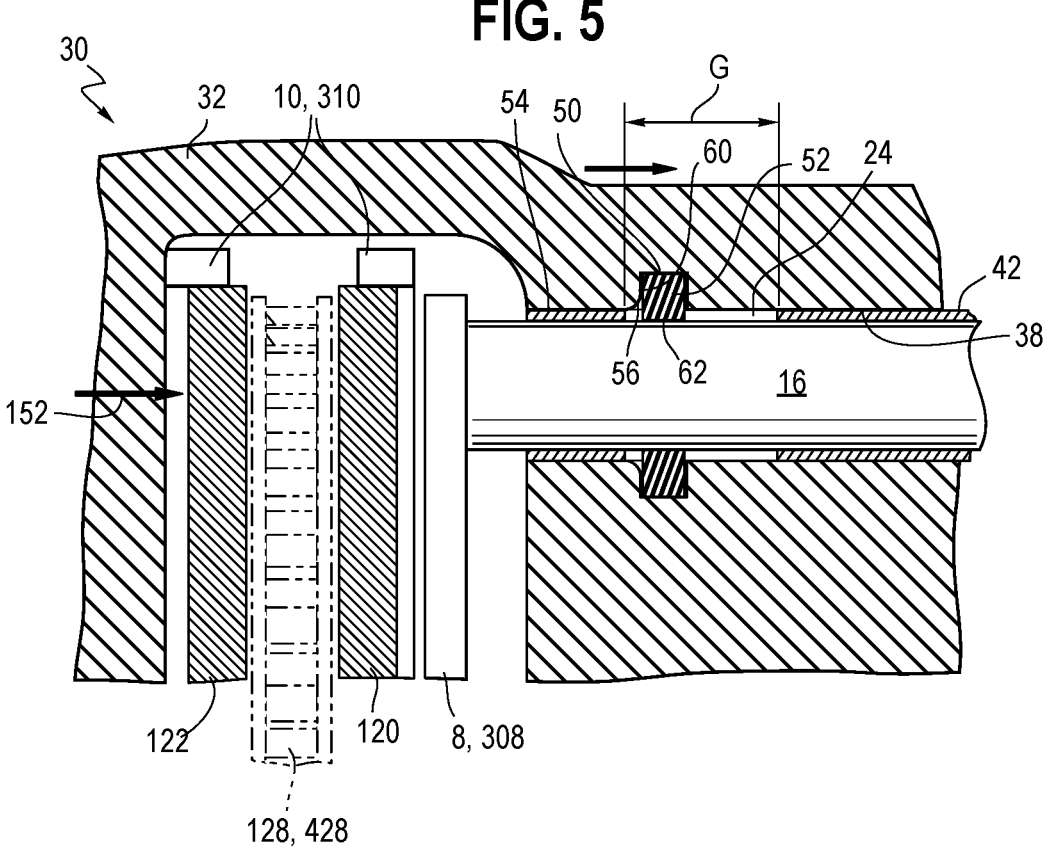
FIG. 5 is an enlarged, partial view of one embodiment of the carrier and guide pin interface.
Figure 6:
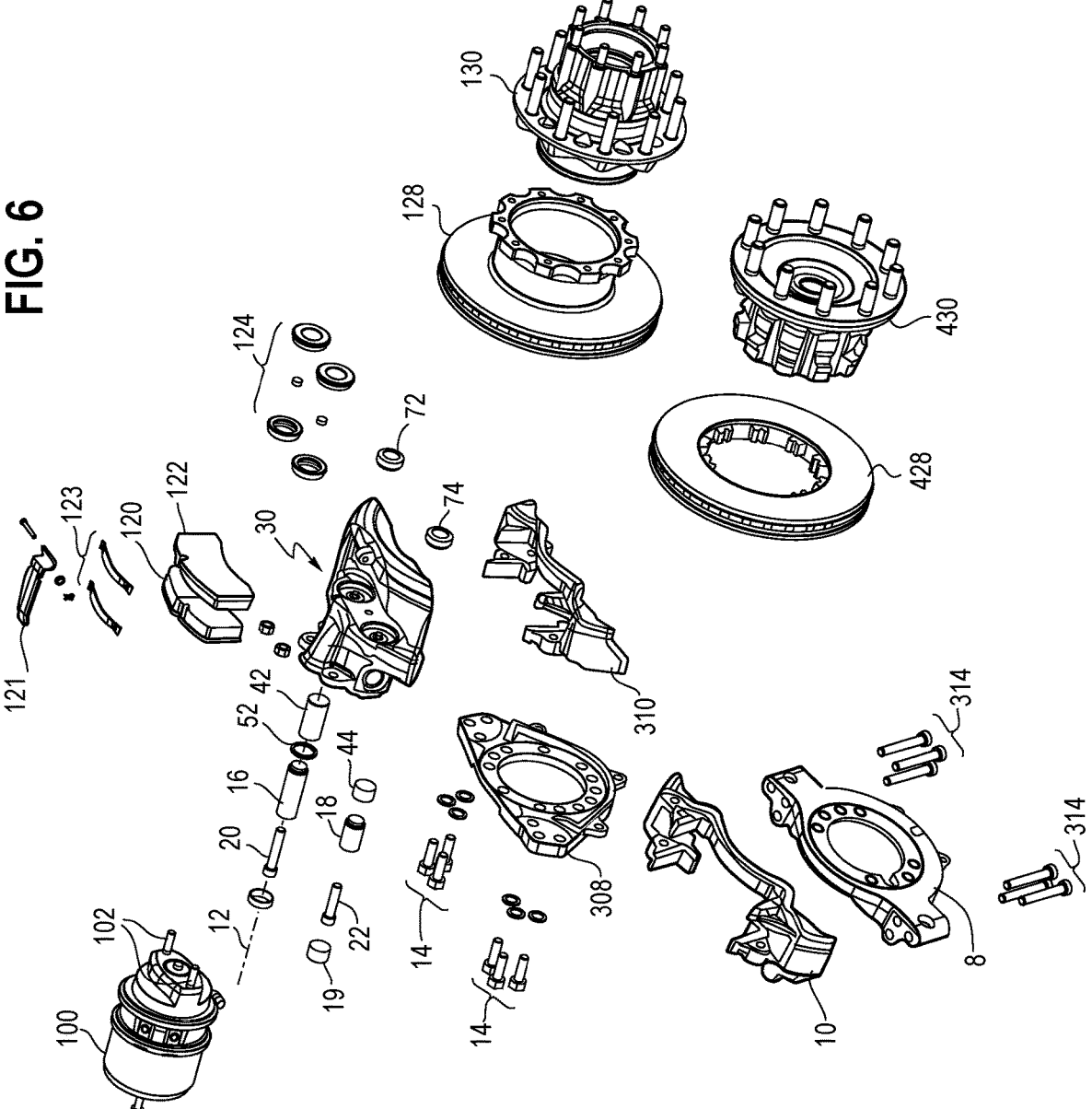
FIG. 6 is an exploded view of one embodiment of an air disc brake system.

The friction ring 52 is deformable in response to a shear force ($F_s$) applied thereto in response to relative movement between the caliper 30 and guide pin 16 as the friction ring 52 grips the guide pin 16. The friction ring 52 bears against the side wall and shoulder 56, which deforms the friction ring 52 inner portion of the friction ring in the axial direction, while the outer portion is supported in the groove. The term "deformable" refers to elastic deformation, meaning the friction ring 52 returns to its initial shape after a load, such as the shear force ($F_s$), is released. A single friction ring 52 may be used on a single guide pin 16, 18, or friction rings may be used on both guide pins 16, 18, and more than one friction ring may be installed in each caliper bore to interface with a single guide pin. The shape of the groove 50, length and angle of the shoulder 56, 58 and/or shaped of the friction ring 52 may be varied and adjusted so as to provide different clearance amounts, and maximum flex strokes, and return biasing forces. The phrase "flex stroke" refers to the distance the guide pin 16 travels relative to the caliper housing 32 with the friction ring 52 being elastically deformed but not sliding along the guide pin, such that after the force ($F_s$) is released, the friction ring 52 biases the caliper in an opposite direction relative to the guide pin 16. The friction ring 52 is not required to seal or prevent the flow of fluid, such that the friction ring may be used to maintain a certain amount of travel. Referring to FIG. 4, a spring 70, for example a wave washer, may be disposed in the groove between a side wall 60 and the friction ring 52 and provide an additional biasing force to the friction ring 52 and caliper housing 32.

Figure 7:
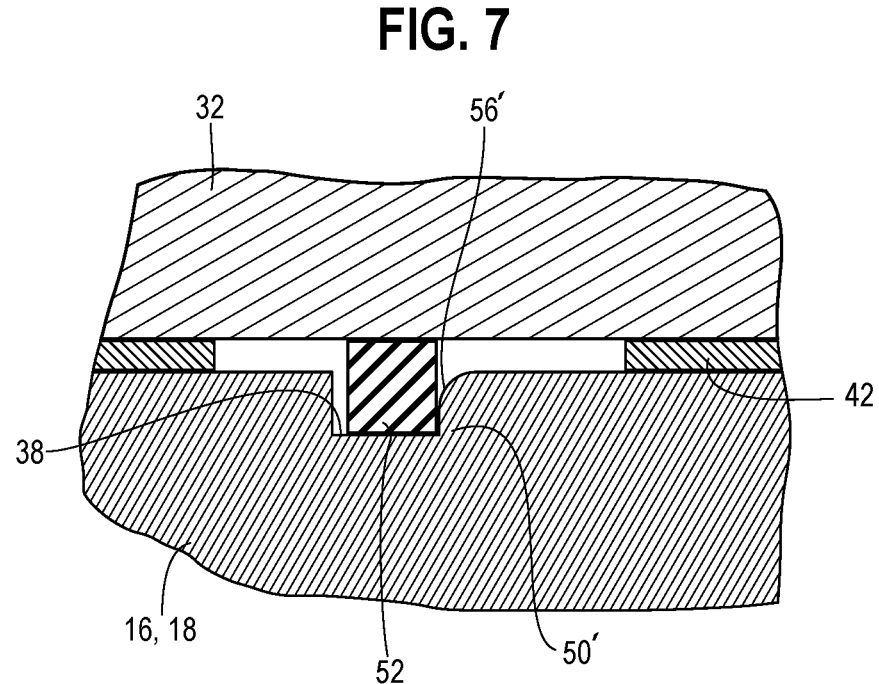
FIG. 7 is a partial, cross-sectional view of another embodiment of a caliper housing mounted on a guide pin.

In an alternative embodiment, shown in FIG. 7, an annular groove 50' is formed on the outer circumferential surface of one or both of the guide pins 16, 18, with the annular groove 50' extending radially inwardly. The friction ring 52 is disposed in the groove 50' and bears against a shoulder 56' while frictionally engaging the inner circumferential surface 38 of the bore.

A boot seal 72, 74 may be coupled to and disposed between the caliper housing 32 and the guide pin 16, 18. The boot seal 72, 74 may be configured with pleats, allowing the boot seal to expand and contract as the caliper 30 is moved relative to the guide pin 16, 18. In one embodiment, the boot seal 72, 74 is longitudinally spaced from the friction ring 52, and is positioned closer to the anchor plate 8, 308 than the friction ring 52. The boot seal 72, 74 and friction ring 52 provide a robust, dual sealing system that prevents dirt or debris from entering the interface between the bushing 42, 44 and guide pin 16, 18.

Figure 2:
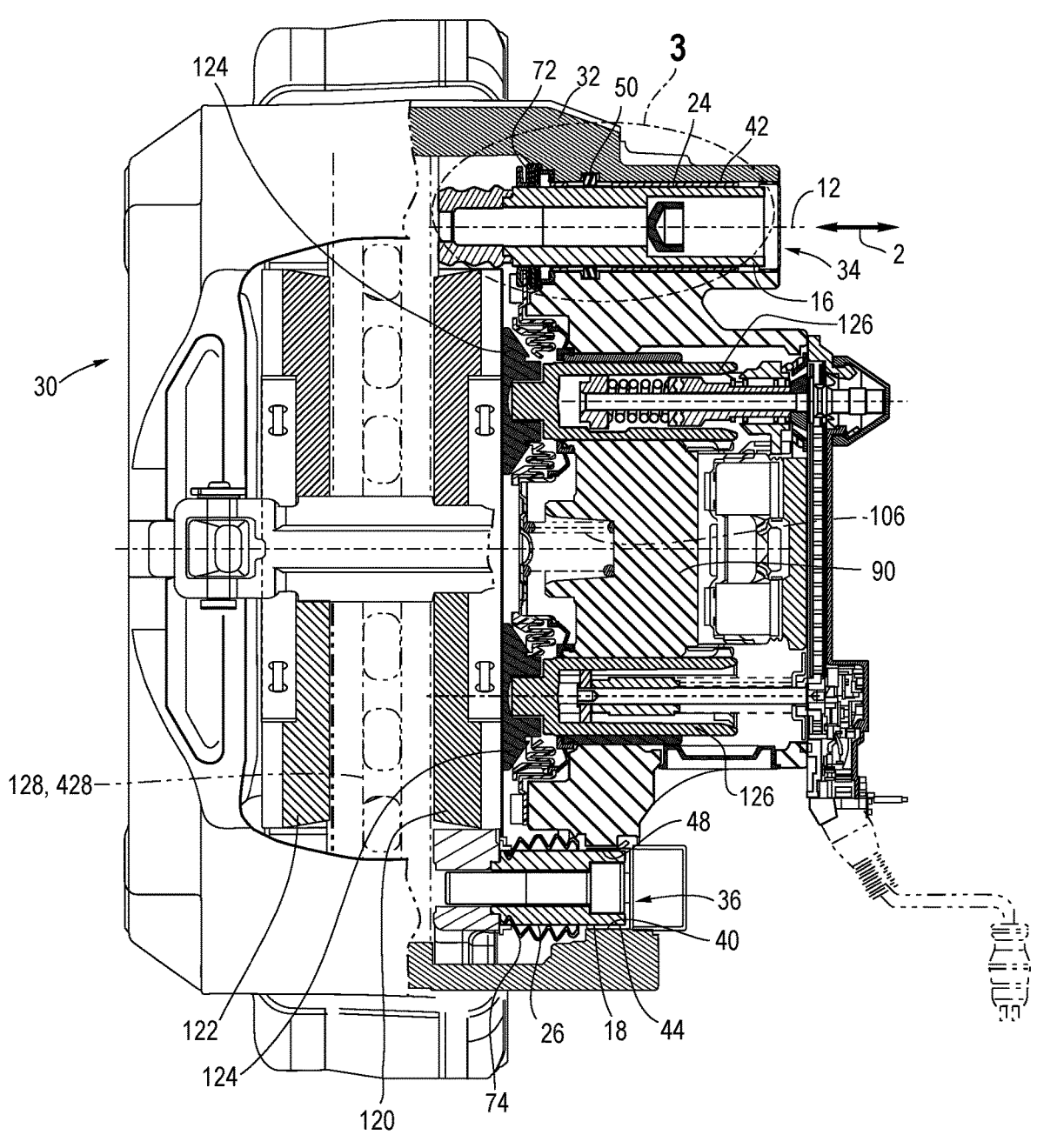
FIG. 2 is a second cross-sectional view of the air disc brake system.

Referring to FIGS. 1 and 2, the caliper housing 32 defines a cavity 80. A lever 82 is disposed in the cavity and is supported by an eccentric bearing 84 disposed in the cavity. The lever 82 has a first portion 86, or arm, extending laterally into the cavity and a second portion 88 engaging a bridge 90, for example through a bearing 92. The first portion 86 is engaged by an actuator 100, which may be mounted to the caliper housing 32 with fasteners 102. The bridge 90 is biased inwardly, away from the brake pads 120, 122 along a longitudinal axis 104 by a return spring 106.

The actuator 100 includes an air supply port 108 in fluid communication with a service brake chamber 110. As air is introduced into the chamber during application of the vehicle brakes, the air applies pressure in the chamber and expands the diaphragm 112 which in turn applies a force to and moves a pressure plate 114 and pushrod 116 in an axial direction. The pushrod 116 engages the first portion 86 of the lever, for example by way of a cup 118 or ball joint, and pushes the lever 82. The lever 82 thereafter rotates and pivots about the eccentric bearing 84 from an unactuated position to an actuated position. As the lever 82 pivots, the second portion 88 of the lever engages and moves the bridge 90 outwardly in the axial direction from a first position to a second position against the force of the return spring 106. The bridge 90 is coupled to and moves a pair of tubes and tappets 124, 126 in the longitudinal direction 2 so as to move an inner brake pad 120 in the longitudinal direction. The inner brake pad 120 engages the brake rotor 128, 428. Further movement of the bridge 90 forces the caliper 30, sliding on the guide pins 16, 18, away from the rotor 128, 428 in the longitudinal direction 2 from a non-braking position to a braking position. The sliding movement of the caliper 30 on the guide pins 16, 18 moves the outer brake pad 122 inwardly toward an opposite side of the rotor 128, thereby clamping the rotor 128, 428 between the inner and outer brake pads 120, 122 and applying a braking force to the brake rotor 128, 428 and attached wheel 130, 430. The brake pads 120, 122 are coupled to the carrier and caliper with a pad retainer 121 and springs 123. As the caliper 30 is moved from the non-braking position to the braking position, the friction ring 52 grips the guide pin and is elastically deformed from a first configuration, which may be an undeformed configuration or slightly deformed configuration, to a second deformed configuration, which has greater deformation than the first configuration, as the inner circumferential surface 62 frictionally engages the outer circumferential surface 24 of the guide pin 16.

Figure 3:
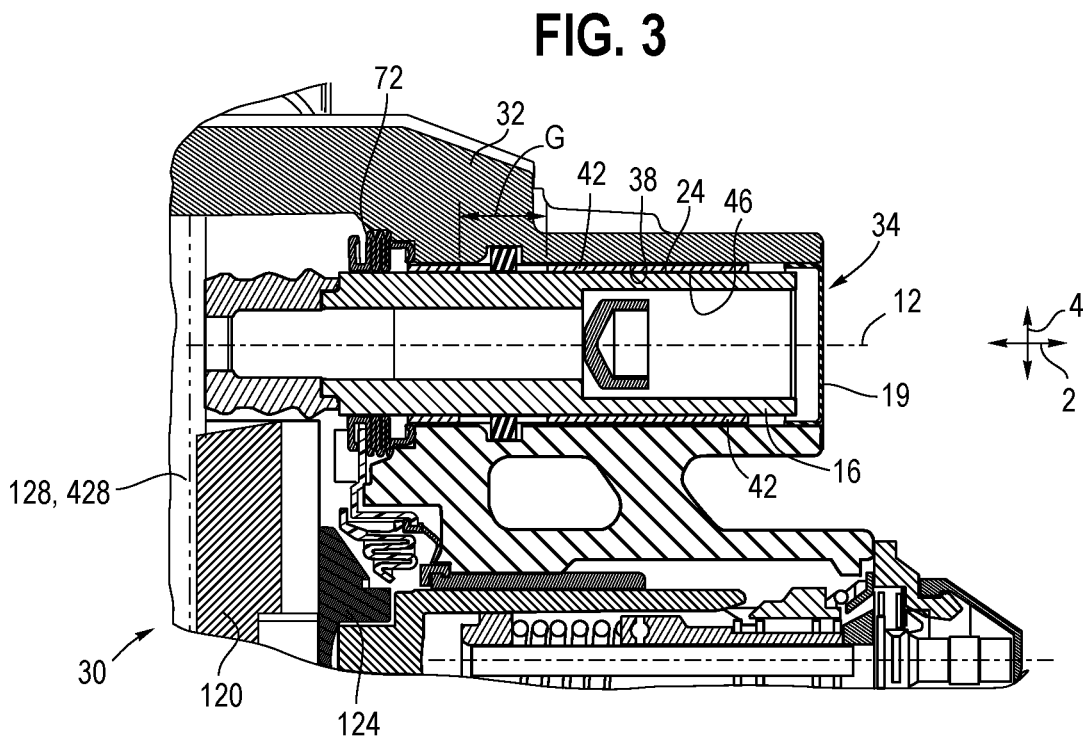
FIG. 3 is an enlarged partial view of the air disc brake system taken along line 3 of FIG. 2.

When the vehicle brakes are released, the air pressure in the service brake chamber 110 is exhausted and the return springs 117, 106 in the chamber and in the cavity acting on the bridge 90 return the air disc brake to a neutral, non-braked position. To maintain an appropriate running clearance gap between the rotor 128, 428 and the brake pads 120, 122 over time, the non-braked position may be mechanically adjusted by a mechanism in the caliper. The adjustment mechanism operates automatically whenever the brakes are activated, to compensate for rotor and brake pad wear and to keep the running clearance constant. After the brake release, the elastically deformed friction ring 52, with stored potential energy, applies a return force to the caliper 30 and biases the caliper from the braking position to the non-braking position. During adjustment of the caliper 30, for example due to wear of the brake pads 120, 122 and/or rotor 128, 428, or if the distance traveled by the caliper 30 between the non-braking position and braking position (i.e., stroke) exceeds a maximum elastic deformation, or maximum flex stroke, of the friction ring 52, the inner circumferential surface 62 of the friction ring is slidable along the outer circumferential surface 24 of the guide pin 16 as shown in FIG. 3, or along the circumferential surface 38 of the bore as shown in the embodiment of FIG. 7. In some embodiments, the return biasing force of the friction ring 52 may be sufficient to provide the release of the brake pads 120, 122 and thereby reduce or eliminate the possibility of drag force.

In operation, one method of actuating an air disc brake system includes applying a force (F1) to the lever 82 with the actuator 100, moving the bridge 90 in a first axial direction 150 with the lever 82 in response to the force (F1) being applied to the lever, moving an inner brake pad 120 operably coupled to the bridge 90 in the first axial direction 150, sliding a caliper 30 in a second axial direction 152 opposite the first axial direction on the guide pin 16, elastically deforming the friction ring 52 disposed between the caliper 30 and the guide pin 16, and moving the outer brake pad 122 in the second axial direction 152 with the caliper 30. The method may further include releasing the force from the lever 82, biasing the bridge 90 in the second axial 152 direction with a spring 106, and biasing the caliper 30 in the first axial direction 150 with the friction ring 52.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. An air disc brake system comprising:

a carrier;

a guide pin mounted to the carrier, wherein the guide pin comprises an outer circumferential surface;

a caliper slidably mounted on the guide pin, wherein the caliper comprises an inner circumferential surface surrounding the outer circumferential surface and an annular groove extending radially outwardly from the inner circumferential surface, wherein the caliper is moveable relative to the guide pin from a non-braking position to a braking position, and wherein the caliper is moveable to the braking position in response to air pressure being applied to an actuator operably coupled to the caliper; and a friction ring disposed in the annular groove, wherein the friction ring comprises an inner circumferential surface engaging the outer circumferential surface of the guide pin, and wherein the friction ring is deformable from a first configuration when the caliper is in the non-braking position to a second configuration when the caliper is in the braking position, and wherein the friction ring biases the caliper from the braking position to the non-braking position.

2. The air disc brake system of claim 1 further comprising a bushing mounted on the inner circumferential surface of the caliper, wherein the outer circumferential surface of the guide pin is slidable along an inner circumferential surface of the bushing.

3. The air disc brake system of claim 2 wherein the bushing comprises longitudinally spaced first and second bushings positioned on opposite sides of the annular groove.

4. The air disc brake system of claim 1 wherein the annular groove comprises a shoulder, wherein the friction ring is deformable at least in part by the shoulder to the second configuration as the caliper is moved to the braking position.

5. The air disc brake system of claim 1 wherein the inner circumferential surface of the friction ring is slidable along the outer circumferential surface of the guide pin when a distance traveled by the caliper between the non-braking position and braking position exceeds a maximum deformation of the friction ring.

6. The air disc brake system of claim 1 wherein the friction ring comprises a rectangular cross-section.

7. The air disc brake system of claim 1 further comprising a boot seal disposed between the caliper and the guide pin, wherein the boot seal is longitudinally spaced from the friction ring.

8. A method of actuating an air disc brake system comprising:

applying a force to a lever;

moving a bridge in a first axial direction with the lever in response to the force being applied to the lever;

moving an inner brake pad operably coupled to the bridge in the first axial direction;

sliding a caliper in a second axial direction opposite the first axial direction on a guide pin;

8 deforming a friction ring disposed between the caliper and the guide pin;

moving an outer brake pad in the second axial direction with the caliper;

releasing the force from the lever;

biasing the bridge in the second axial direction with a spring; and biasing the caliper in the first axial direction with the friction ring.

9. The method of claim 8 wherein the guide pin comprises an outer circumferential surface, the caliper comprises an inner circumferential surface surrounding the outer circumferential surface and an annular groove extending radially outwardly from the inner circumferential surface, and wherein the friction ring is disposed in the annular groove and engages the outer circumferential surface of the guide pin.

10. The method of claim 9 further comprising a bushing mounted on the inner circumferential surface of the caliper, and wherein sliding the caliper in the second axial direction comprises sliding the bushing along the outer circumferential surface of the guide pin.

11. The method of claim 8 further comprising sliding the guide pin relative to the friction ring after deforming the friction ring.

12. The method of claim 8 wherein the annular groove comprises a shoulder, and wherein deforming the friction ring comprises engaging the shoulder with the friction ring.

13. The method of claim 8 wherein the friction ring comprises a rectangular cross-section.

14. The method of claim 8 further comprising a boot seal disposed between the caliper and the guide pin, wherein the boot seal is longitudinally spaced from the friction ring, and wherein sliding the caliper in the second axial direction comprises expanding the boot seal.

15. An air disc brake system comprising:

a carrier;

a guide pin mounted to the carrier, wherein the guide pin comprises an outer circumferential surface;

a caliper comprising:

a housing slidably mounted on the guide pin, wherein the housing comprises a bore having an inner circumferential surface surrounding the outer circumferential surface and an annular groove extending radially outwardly from the inner circumferential surface, and wherein the housing is moveable relative to the guide pin from a non-braking position to a braking position;

a lever supported by an eccentric bearing disposed in the housing, wherein the lever comprises a first portion engageable by an actuator, and a second portion, wherein the lever is pivotable relative to the caliper housing on the eccentric bearing from an unactuated position to an actuated position; and a bridge engaged by the second portion of the lever, wherein the bridge is moveable from a first position to a second position as the lever is pivoted from the unactuated position to the actuated position; and a friction ring disposed in the annular groove, wherein the friction ring comprises an inner circumferential surface engaging the outer circumferential surface of the guide pin, and wherein the friction ring is deformable from a first configuration when the housing is in the non-braking position to a second configuration when the housing is in the braking position, and wherein the friction ring biases the housing from the braking position to the non-braking position.

16. The air disc brake system of claim 15 further comprising a bushing mounted in the bore of the housing along the inner circumferential surface of the housing, wherein the outer circumferential surface of the guide pin is slidable along an inner circumferential surface of the bushing.

17. An air disc brake system comprising:

a carrier;

a guide pin mounted to the carrier, wherein the guide pin comprises an outer circumferential surface and an annular groove extending radially inwardly from the outer circumferential surface;

a caliper slidably mounted on the guide pin, wherein the caliper comprises an inner circumferential surface surrounding the outer circumferential surface, and wherein the caliper is moveable relative to the guide pin from a non-braking position to a braking position; and a friction ring disposed in the annular groove, wherein the friction ring comprises an outer circumferential surface engaging the inner circumferential surface of the caliper, and wherein the friction ring is deformable from a first configuration when the caliper is in the non-braking position to a second configuration when the caliper is in the braking position, and wherein the friction ring biases the caliper from the braking position to the non-braking position.

\* \* \* \* \*